(12) United States Patent
Scioscio

(10) Patent No.: US 7,905,226 B2
(45) Date of Patent: Mar. 15, 2011

(54) SYNTHETIC OIL-FILLED DOUBLE-BOTTOM POT AND PAN

(76) Inventor: Paul R. Scioscio, Brick, NJ (US)

( * ) Notice: Subject to any disclaimer, the term of this patent is extended or adjusted under 35 U.S.C. 154(b) by 577 days.

(21) Appl. No.: 12/080,758

(22) Filed: Apr. 7, 2008

(65) Prior Publication Data

US 2008/0230547 A1    Sep. 25, 2008

Related U.S. Application Data

(63) Continuation-in-part of application No. 10/818,885, filed on Apr. 7, 2004, now abandoned.

(51) Int. Cl.
*A47J 27/00* (2006.01)

(52) U.S. Cl. .............. 126/390.1; 126/376.1; 126/378.1; 220/573.1; 220/573.2; 219/439

(58) Field of Classification Search .............. 126/390.1, 126/376.1, 378.1, 561, 714; 220/573.1, 573.2; 219/439
See application file for complete search history.

(56) References Cited

U.S. PATENT DOCUMENTS 4,629,866 A * 12/1986 Proctor .................. 219/439
6,191,393 B1 * 2/2001 Park ..................... 219/439

* cited by examiner

*Primary Examiner* — Alfred Basichas
(74) *Attorney, Agent, or Firm* — Charles I. Brodsky

(57) ABSTRACT

A double-bottom pot with synthetic, silicon heat transfer oil sealed in a cavity formed between them to the extent of 100 percent of its volume, to disperse and evenly spread to the food contents the heat from an applied flame or burner no matter how high the temperature.

10 Claims, 1 Drawing Sheet

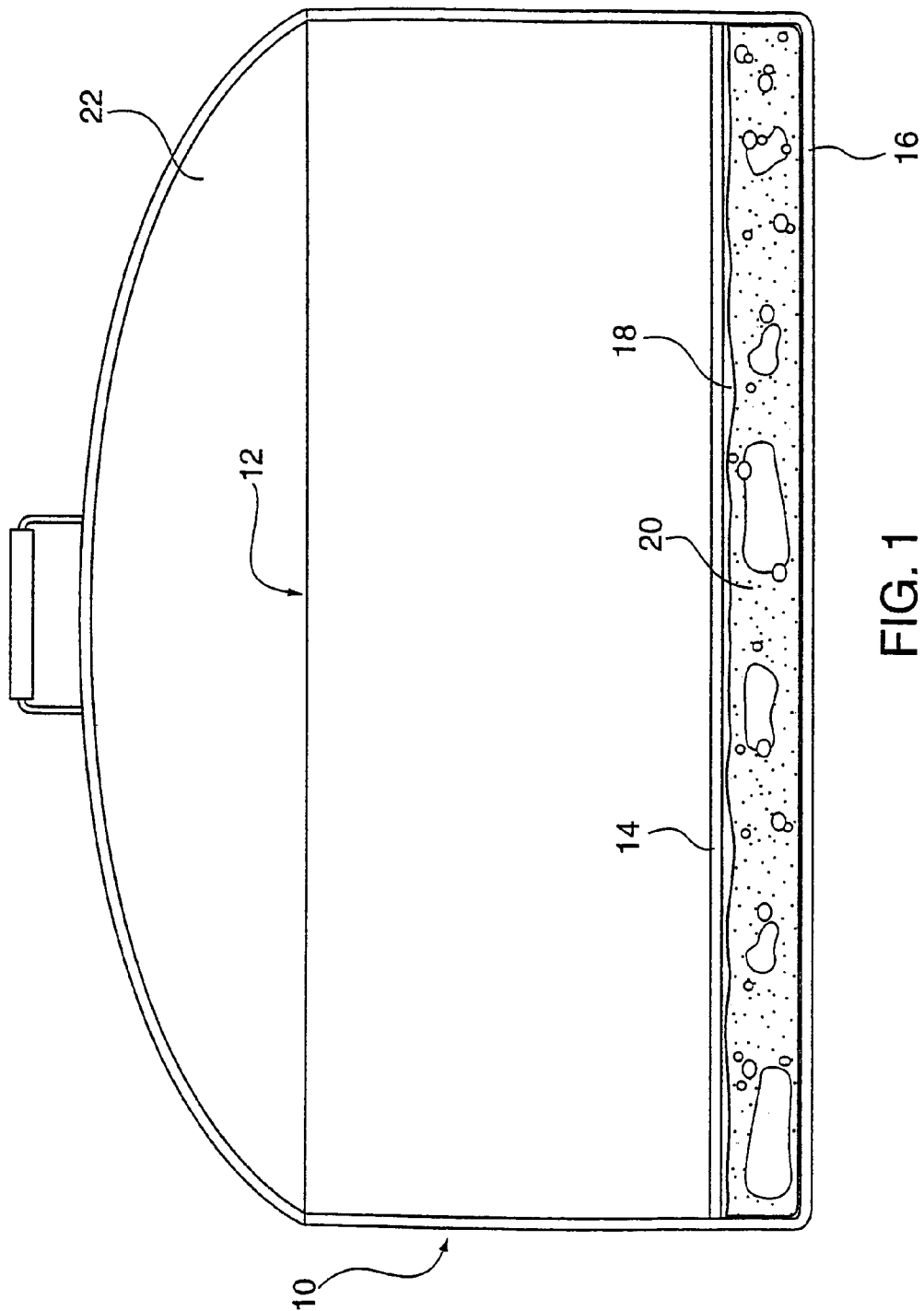

SYNTHETIC OIL-FILLED DOUBLE-BOTTOM POT AND PAN

CROSS-REFERENCE TO RELATED APPLICATIONS

This application is a Continuation-in-Part of application Ser. No. 10/818,885, filed Apr. 7, 2004 now abandoned.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to a pot for cooking sauce, stew, chili or thick soups on a stove, in general, and to one which could be used for frying as well. More particularly, it relates to a pot whose contents do not have to be stirred to prevent burning, regardless of how hot the flame or burner may be.

2. Description of the Related Art

As is well known and understood, "high-end" cooking pots usually have a copper or aluminum bottom so as to disperse and spread the heat of an open flame or burner evenly across their contents. However, as experience has shown, one must continue to stir the ingredients every 10-15 minutes or so—even when simmering, otherwise the ingredients tend to burn, distributing the "burnt" flavor throughout. Were this not bad enough, a burnt cake residue is frequently left on the inside of the pot, which then has to be thereafter scraped clean.

SUMMARY OF THE INVENTION

As will become clear from the following description, the present invention envisions a second bottom on the pot, downwardly extending from the first, with a layer of synthetic, silicon heat transfer oil sealed in a cavity so formed between them. (Such oils are known to withstand high temperatures and remain stable with little viscosity change when heated for extended periods, even to temperatures exceeding 500° F.) Applying a flame or the heat of a burner to the second bottom heats the oil, which then transfers the heat to the first bottom, above which the food sits. Since the synthetic, silicon heat transfer oil does not expand, burn or break down, the heat of the flame or burner is then applied evenly to the "food pot", rather than just to the point(s) at which the flame or burner contacts the pot with prior cooking methods. While a preferred embodiment of the invention is one where the cavity is 100 percent completely filled with the synthetic, silicon heat transfer oil, satisfactory (although somewhat less than optimum) results are obtained where the cavity is filled with the synthetic, silicon heat transfer oil down to 95 percent of the volume, with the remaining space being filled by air or vacuum. In the preferred embodiment, the pot of the invention is manufactured of a stainless steel, of a gauge to resist expansion with heat being applied, and with the cavity not only being sealed, but being welded shut. A totally sealed, 100 percent filled cavity thus results, strong enough to resist any expansion.

Double-bottom pots have previously been described in the prior art. U.S. Pat. No. 400,385, for example, shows a holder for heating the contents of a jar, with the jar being immersed in a bath of hot water. U.S. Pat. No. 4,629,866, on the other hand, shows a coffee maker having an inner wall and an outer wall, joined by a sealed cavity containing a heat transfer liquid, to regulate the temperature of the coffee. While U.S. Pat. No. 1,493,459 relates to such cooking utensils as frying pans and saucepans which include inner and outer body members spaced to form a chamber, the chamber has to be continually refilled through its handle to prevent burning or scorching of its included food product.

Several double-bottom pots are also described in the category of "crock pots"—which are electrically operated, slow cookers at low heat. Typically shown in U.S. Pat. No. 4,667,085, U.S. Pat. No. 6,191,393, U.S. Pat. No. 6,305,272, U.S. Pat. No. 6,320,166 and U.S. Pat. No. 6,467,645, such pots are conventionally plugged into a wall socket, and left to sit for upwards of 6-8 hours at low heat.

With the invention at hand, however, the cooking can be done on a stove at high heat, allowing for other cooking or other tasks to be carried out without having to regularly stir the contents of a pot to avoid burning. This extends to whether the pot is used to cook sauce, stew, chili or soup, or is used to fry some or all of its ingredients. With the 100 percent filling of the cavity, furthermore, the synthetic, silicon heat transfer oil transfers all of the applied heat to the bottom of the pot where the cooking is done. This allows the heat to be evenly applied yet without allowing hot spots to be created, and because of the absence of any air inside. And, with the welding shut of the cavity, an absolute seal follows so that no leakage of the oil can result.

BRIEF DESCRIPTION OF THE DRAWINGS

These and other features of the invention will be more clearly understood from a consideration of the following description, taken in connection with the accompanying sole FIGURE of the Drawing showing a cross-sectional view of a cooking utensil according to the teachings of the present invention.

DETAILED DESCRIPTION OF THE INVENTION

In FIG. 1, a container for cooking spaghetti sauce, stew, chili or thick soups on the flame or burner of a stove includes a shell 10 having an opening at its top 12 and a first heat-conductive plate 14, of a composition to distribute the heat as evenly as possible to its food contents. A second heat-conductive plate 16 extends downwardly from the first plate 14 to form a sealed cavity 18 between the two. In accordance with the invention, a synthetic, silicon heat transfer oil 20 fills the cavity 18 to at least 95 percent of its volume. While the cooking container performs satisfactorily well in this manner—with the remainder of the cavity volume being filled by air or vacuum—optimum results follow when the synthetic, silicon heat transfer oil substantially fills the cavity to 100 percent of its volume. As the oil 20 does not expand upon heating nor break down over time, it is effective to disperse, distribute and spread evenly all the heat applied to it from the flame or burner to the food at the bottom of, and throughout, the shell 10.

In such preferred embodiment, the shell 10 and second heat-conductive plate 16 are composed of the same material—for example, stainless steel of a gauge to resist expansion with heat being applied. The two plates 14 and 16 are welded together at their top edges in forming the cavity 18, which may be as large as desired. A totally sealed, 100 percent filled cavity thus results, and is maintained as the oil is prevented from leaking out.

FIG. 1 also shows a lid 22 covering the opening 12. Such lid 22 may also be of the same material composition as the shell 10 and the second heat-conductive plate 16, and any type of carry handle(s) for the shell or lid may be used. With the lid 22 in place, the cooking container of FIG. 1 may comprise a sauce pot. Without the lid 22, the cooking container may comprise a frying pan—but, even with the lid 22 in place, some of the contents of the shell can be fried while the remaining contents are being cooked. This follows, for example, when the volume of the shell 10 is selected substantially twelve times the volume of the sealed cavity 18. For a pot cooking spaghetti sauce, stew, chili or thick soup of twelve quart capacity a sealed cavity of one quart for the synthetic, silicon heat transfer oil works quite well. Because the oil does not break down, because the oil is sealed so that it does not touch the food content, and because the oil disperses and distributes the heat evenly to the first heat-conductive plate, no "hot spots" are produced to burn any food at the bottom of the pot. This is especially so, no matter where the actual flame or burner placement might lie with respect to the second heat-conductive plate. Because the oil is synthetic, it will not lose its viscosity gel, nor expand, nor burn off. The cooking container of the invention could then be left unattended for hours even at high heat—useful as a "fast" cooker where the heat continues to be spread evenly at the bottom—, or as a fryer for even higher heats.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A cookware container for transferring heat from an open flame or burner to food to be cooked therein, comprising:

a stainless steel shell having a top opening, a first heat-conductive plate upon which food to be cooked within said shell is placed, a second heat-conductive plate adapted for placement directly on said open flame or burner extending downwardly from said first plate in forming a cavity therebetween of predetermined volume, with said cavity being sealed between said first and second heat conductive plates by welding said first and second heat-conductive plates together; and a synthetic, silicon heat transfer oil filling said cavity to 100 percent of the volume thereof.

2. The cookware container of claim 1, also including a lid covering said stainless steel shell.

3. The cookware container of claim 1 wherein said stainless steel shell comprises a sauce pot.

4. The cookware container of claim 1 wherein said stainless steel shell comprises a frying pan.

5. The cookware container of claim 1 wherein said stainless steel shell is of a volume substantially 12 times the volume of said sealed cavity.

6. The cookware container of claim 1 wherein said stainless steel shell consists of a pot of twelve quart volume.

7. The cookware container of claim 1 wherein said first and second heat-conductive plates are of a stainless steel gauge to resist expansion with heat being applied from said flame or burner.

8. The cookware container of claim 7 wherein said synthetic, silicon heat transfer oil is characterized to withstand high temperatures and to remain stable with little viscosity change when heated for extended periods, and wherein said synthetic, silicon heat transfer oil is characterized to withstand high temperatures and to remain stable with little viscosity change when heated for extended periods.

9. The cookware container of claim 1 wherein said synthetic, silicon heat transfer oil is characterized to withstand high temperatures and to remain stable with little viscosity change when heated for extended periods.

10. The cookware container of claim 1 wherein said synthetic, silicon heat transfer oil is characterized to withstand high temperatures and to remain stable with little viscosity change when heated for extended periods.

* * * * *